Nov. 24, 1959
J. L. KELLER
2,914,455
HYDROCARBON SEPARATION PROCESS
Filed July 25, 1955
2 Sheets-Sheet 1
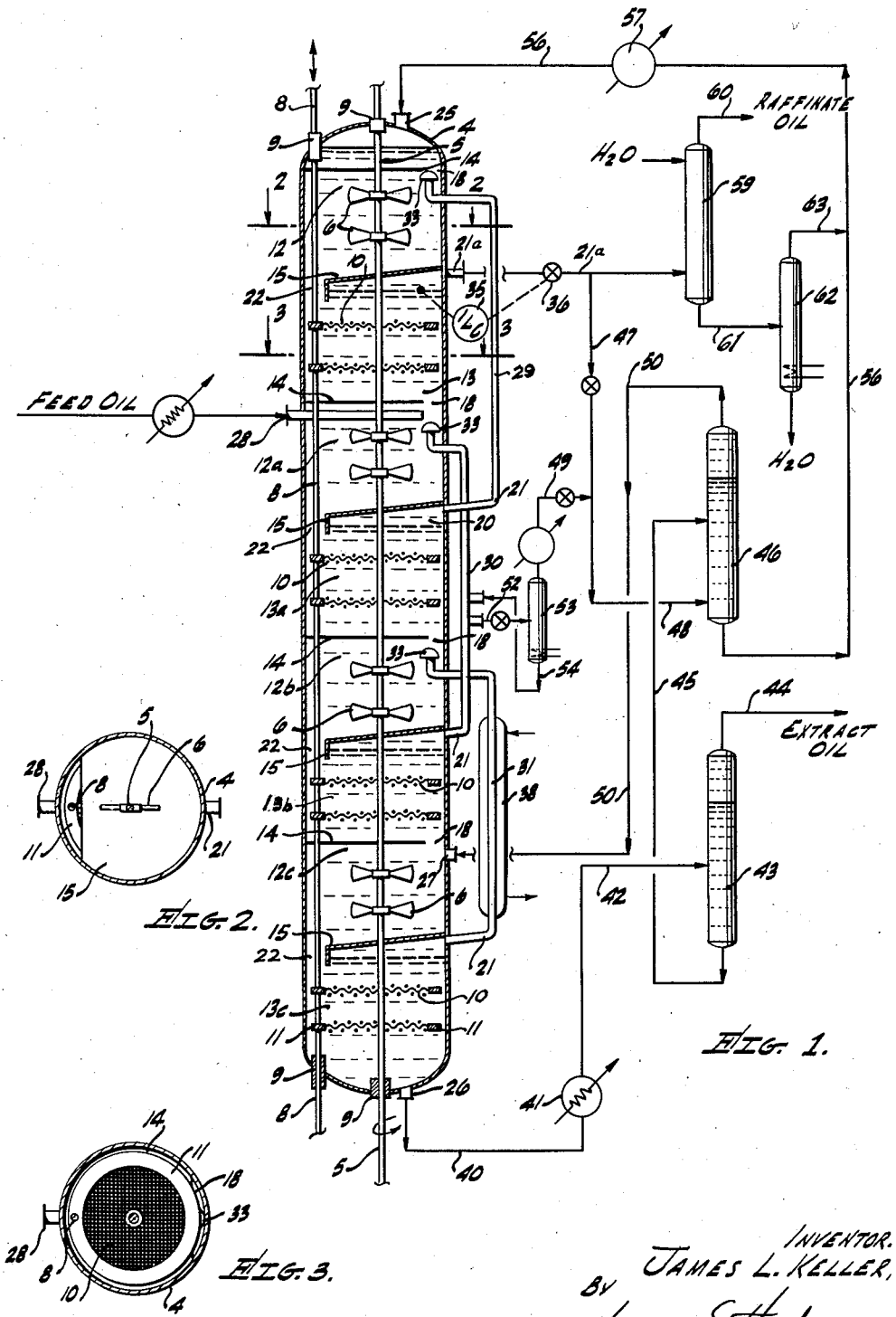
INVENTOR.
JAMES L. KELLER,
BY
Launas S. Henderson
AGENT.

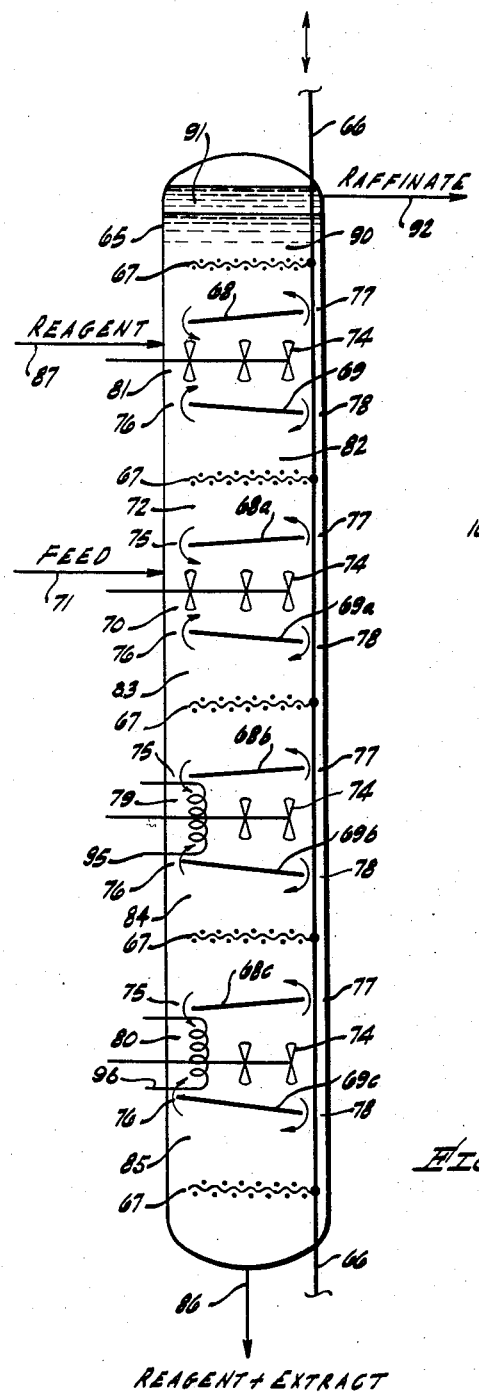

United States Patent Office 2,914,455
Patented Nov. 24, 1959

2,914,455

HYDROCARBON SEPARATION PROCESS

James L. Keller, Brea, Calif., assignor to Union Oil Company of California, Los Angeles, Calif., a corporation of California Application July 25, 1955, Serial No. 524,027

15 Claims. (Cl. 208—25)

This invention relates generally to the fractionation of mixtures of organic compounds, particularly hydrocarbon mixtures, wherein one or more components display a greater tendency to form solid adducts with urea or thiourea than do other components of the mixture. More particularly the invention relates to an improved process for contacting such mixtures with urea or thiourea, and for recovering the adducted and non-adducted hydrocarbons from the reaction mixtures.

Briefly stated, the method consists in first agitating at a low temperature a saturated solution of urea or thiourea in certain aqueous-organic solvents with the hydrocarbon oil to be resolved, whereby a complex, thixotropic, reaction slurry is formed comprising solvent, unreacted dissolved urea, unreacted undissolved hydrocarbon oil, solid adduct, and in some cases undissolved solid urea. This reaction slurry is then subjected to a critically controlled mild degree of agitation, and/or to centrifugation, whereby substantially all of the undissolved, unreacted hydrocarbon oil droplets rise to form a supernatant liquid layer, and the solid components settle exclusively into the lower solvent phase, forming a second slurry termed the adduct slurry. The adduct slurry is then separated as a unitary liquid phase from the supernatant unreacted oil phase, and is heated to a temperature sufficient to decompose the adduct. A second oil phase is thereby liberated, consisting of the hydrocarbons which reacted with the urea. Upon decomposition of the adduct, the adduct slurry loses its original thixotropic character and becomes either a saturated solution of urea, or a suspension of solid urea in a saturated urea solution. In either case the liberated hydrocarbon phase forms a second supernatant layer which is decanted from the regenerated urea reagent, the latter being then recycled to contact fresh feed oil. By this procedure, the entire sequence of steps including contacting, raffinate recovery, adduct decomposition, extract recovery, and reagent recovery are performed without once effecting a physical separation of a solid phase from a liquid phase, the complete cycle being based upon liquid-liquid phase separations.

It is therefore the principal object of this invention to provide means and methods whereby urea extraction separatory processes may be performed without resorting to expensive liquid-solid separation techniques.

A further object is to provide means whereby urea extraction separations may be carried out in a continuous manner based exclusively upon liquid-liquid phase separations, analogous to solvent extraction techniques.

Another object is to provide means for performing urea extraction-separations while completely avoiding the problems and expense connected with the separation from liquid phases of discrete solid phases, and the transporting and handling of such solid phases.

A more specific object is to provide certain solvent media for the formation of urea and thiourea adducts which will (1) accelerate the adduct-formation rate, (2) be substantially immiscible with both the adduct-forming and non-adduct-forming components of the hydrocarbon feed oils, (3) exhibit at the process temperatures a sufficient solvent capacity for urea or thiourea to provide solutions thereof which are intermediate in specific gravity between the hydrocarbon oil and the solid adducts thereof, and (4) be of such character that the solid hydrocarbon adducts crystallized therefrom are in a bulky, finely-divided crystalline form which tends to remain suspended therein, forming an adduct slurry which is readily handled as such and is phase-separable from other immiscible liquid phases without undergoing substantial solid-liquid stratification.

A further object is to provide methods for effecting phase-separation of oil droplets enmeshed within slurries of finely-divided, crystalline urea-adduct suspended in polar liquids.

Since the discovery by Bengen (Technical Oil Mission Reel 6 Frames 263–270) that certain straight-chain hydrocarbons form solid addition products with urea, and that other hydrocarbons generally do not form such addition compounds, numerous attempts have been made to devise commercially practical processes for accomplishing this type of separation. The process is of importance in the production of pure straight-chain paraffins, in the production of branch-chain and/or cyclic hydrocarbons free from n-paraffins, and in miscellaneous separation and purification processes. Thiourea forms analogous solid adducts with certain branch-chain and naphthenic hydrocarbons while not forming adducts with straight-chain hydrocarbons.

The urea process described herein has been found to be especially advantageous for removing n-paraffin components of jet fuels which cause the jet fuel to have a high freezing point. Jet fuels having cloud points of less than $-100°$ F. have been produced as raffinate oil by this method where only 5–20% by volume of n-paraffins is removed as an extract oil. The urea process is also useful for removing n-paraffin components from lube oil stocks, diesel fuels, gasoline fractions, and the like. The thiourea process is useful for improving the cetane number of diesel fuels.

In processes which involve merely the handling of liquid phases, the various liquid phases may be separated from each other by decantation and transferred from one point in the process to another by means of pipelines and pumps. These handling techniques are inherently more economical than those which are necessary for separating, handling and transporting solid materials. When a solid phase must be separated from a liquid phase, this is generally done either by filtration, settling, or centrifuging. Filtration and settling are economical only in cases where the solid phase is composed of coarse particles which may be rapidly filtered or settled. Centrifuging presents the inherent disadvantage of requiring expensive equipment, close control and expensive maintenance problems. In the prior art relating to urea or thiourea separations, it has been the invariable practice to employ at some point in the process a partial or complete separation of solid adduct from a liquid phase, for subsequent recovery of the adducted hydrocarbons. This inherently results in increasing the cost of the operation. This increase in cost is further accentuated because the urea adducts are normally extremely bulky and voluminous, sometimes appearing almost gelatinous. This characteristic obviously increases the difficulty of separating such solid phases by any of the above mentioned means. The present process utilizes a specific reaction medium, and employs specific techniques which permit the complete elimination of any such solid separation step.

In the prior art processes, when the urea adduct has been separated as a solid, it is then necessary to transport it to another part of the system for regenerating the urea and recovering the adducted hydrocarbons. The transfer of such solid materials generally requires the installation of conveyor belts, bucket lift conveyors, screw conveyors, gas lift lines or the like, entirely extraneous from the simple piping and pumping systems required for transporting liquids. This expense is likewise avoided herein because no solid phase is ever isolated.

In the initial stage of the process the urea or thiourea, in the form of a saturated solution-suspension in the particular solvents hereinafter defined, is contacted and agitated at low temperatures with the feed oil. The solvent is substantially immiscible with the hydrocarbon feed, but does dissolve a small proportion thereof, and thereby accelerates the rate of adduct formation. The adduct, as stated above, is bulky and voluminous. It is composed of very fine needle-like interlacing crystals which tend to form a network. The unreacted hydrocarbon oil tends to become enmeshed within this network, and will not spontaneously separate therefrom in a reasonable length of time. The whole reaction slurry of adduct plus unreacted oil exhibits thixotropic properties. Rheological data obtained by Stormer viscosimeter measurements have shown plastic yield points for various adduct slurries ranging between 163 and 660 dynes/sq. cen. The occluded droplets of unreacted oil will thus remain enmeshed in the adduct network indefinitely in spite of a considerable difference in specific gravity between oil and solvent, and between oil and adduct. It has hence been considered necessary in the past to subject such mixtures to the above mentioned liquid-solid separation procedures. In view of the nature of the solid adduct, the separation of the solid is necessarily slow, and in commercial practice requires large continuous filters for even a moderate throughput of material. The filtration of large volumes of bulky fine precipitates is notoriously slow and requires a high capital outlay.

The term "thixotropic," as employed herein is intended to designate a positive plastic yield value, i.e. above zero, but does not necessarily refer to a true colloidal gel structure.

It has now been found that the initial, thixotropic reaction slurry from the contacting stage may be subjected to a mild, critically controlled degree of agitation which permits the rising of the unreacted oil droplets to form a supernatant liquid phase, without effecting any noticeable settling of the solid adduct in the solvent phase. A similar separation of the unreacted oil may be obtained by subjecting the reaction slurry to centrifuging, particularly when the centrifuging is carried out while vibrating the centrifuge to enhance the separation. However, the centrifuging operation in some cases tends also to cause a partial or complete separation of the solid adduct from the solvent phase, and is disadvantageous from this standpoint. The stratification of the solid phase within the solvent phase complicates the handling of the adduct slurry as a unitary phase, in that the partially settled adduct may tend to accumulate in valves, pumps, and in various sectors of the apparatus where there is insufficient turbulent flow of the liquid to sweep out the solid particles, resulting in local over-concentrations. In the preferred operation described herein the reaction slurry is treated in such manner as not only to obtain substantially complete separation of the unreacted oil phase, but also to maintain the solid adduct substantially uniformly and coextensively suspended in the solvent phase, so that the resulting adduct slurry may be handled and transferred as a unitary liquid phase.

The success of this process depends primarily upon the novel features of (1) employing the particular solvents defined herein, and (2) controlling the degree of agitation during the separation of unreacted oil from the reaction slurry. Without observing both of these conditions, the desired wholly liquid phase operation will not be obtainable.

The solvents found to be operative in the process comprise mixtures of water with certain organic solvents, i.e. methanol, ethanol, propanol, iso-propanol, acetone and acetic acid. The proportion of water may range between about 5% and 30% by volume, the remainder being one or more of the mentioned organic solvents. Within this stated composition range, the relative proportion of water should preferably be further adjusted so that the average solubility of the feed oil therein ranges between about 0.01% and 0.2% by volume at 77° F., when the solvent is saturated with urea. This optimum solubility relationship will be obtained at different water concentrations for the different solvents. For example in the case of acetone, percentages of water ranging closer to 30% by volume will preferably be employed, while in the case of methanol percentages of water ranging closer to 5% will preferably be employed.

For each of the individual organic solvent components, the optimum volume-percent concentrations in the solvent are about as follows:

| | |
|---|---|
| Methanol | 85–95 |
| Ethanol | 80–90 |
| Propanol | 75–85 |
| Iso-propanol | 75–85 |
| Acetone | 70–80 |
| Acetic acid | 70–85 |

All of the solvent compositions defined are found to exhibit considerable solvent capacity for urea or thiourea, ranging for example between about 20% and 50% by weight at 77° F.

From the standpoint of obtaining least viscous, and hence most easily handleable adduct slurries, it is preferred that the lower proportions of water be employed in the solvents. It has been found that those solvents containing less than 20% by volume of water generally give noticeably less viscous reaction slurries than those containing more than 20%.

It is preferable to maintain throughout the process a substantial proportion of unreacted urea dissolved in the solvent, e.g. at least about 5% by weight, thereby insuring that the solvent phase will always exhibit a higher specific gravity than any oil phase which separates. By adjusting the relative proportions of water and organic solvent so that the 77° F. solvent capacity for feed oil ranges between about 0.01% and 0.2%, a sufficient solvency for the hydrocarbons is maintained to insure a rapid rate of adduct formation, while at the same time permitting a relatively sharp phase separation of unreacted oil from the adduct slurry phase, and of regenerated reacted oil from the regenerated urea reagent phase.

It will be understood that in the initial contacting stage, wherein the feed oil is contacted at temperatures of e.g. 30°–100° F., with the regenerated urea reagent, the urea reagent preferably comprises a saturated solution of urea in the solvent, plus excess undissolved urea. As the adduct formation proceeds the dissolved urea reacts with the adduct-forming components of the feed and precipitates as the adduct. Additional solid urea then dissolves, thereby maintaining a substantially saturated solution.

The proportion of oil which is contacted with the reagent is preferably adjusted so that a readily handleable reaction slurry is obtained. If too large a proportion of oil is reacted, the reaction slurry may become almost solid in consistency, and the solid adduct may tend to agglomerate and cling to the walls of the reaction vessel. It is therefore preferable to continue the initial contacting only to the extent of producing a readily handleable, fluid slurry, and should preferably not be continued to the extent of reacting all of the urea. Maintaining excess dissolved urea enhances the phase separation of unreacted oil by maintaining a high specific gravity of the solvent phase, and also inhibits the solubility of the oil in the solvent thereby further enhancing the sharpness of phase separation. In general it is found that reagent/feed ratios may range between about 1.0 and 10 by volume, and preferably between about 2.0 and 5.

In general each mol of n-paraffin reacts with $1.50+0.67x$ mols of urea where $x$ is the number of carbon atoms in the paraffin. Generally speaking this ratio corresponds to about 2.5 grams of urea per milliliter of n-paraffin.

The relationship existing between solvent composition, urea solubility and density of the solution is illustrated in the following table for methanol-water solvents:

TABLE 1

| Solvent, Vol. Percent | | Saturation Temp., °F. | Density, gm./ml. | Weight Percent Urea |
|---|---|---|---|---|
| Methanol | Water | | | |
| 100 | 0 | 77 | 0.872 | 19.7 |
| 90 | 10 | 77 | 0.946 | 27.6 |
| 80 | 20 | 77 | 0.989 | 31.7 |
| 90 | 10 | 86 | 0.935 | 29.9 |
| 90 | 10 | 108 | ------ | 36.0 |
| 90 | 10 | 140 | 1.00 | 50.0 |

The relative solubilities of stove oil raffinate (from a urea extraction) in methanol-water mixtures, and in the same mixtures saturated with urea is illustrated in the following table:

TABLE 2

*Solubility of stove oil raffinate in methanol-water mixtures±urea*

| Vol. Percent Methanol in Solvent | Solubility, Volume Percent 77° F. | |
|---|---|---|
| | No Urea | Urea-Saturated |
| 80 | 0.1 | 0.06 |
| 90 | 0.6 | 0.08 |
| 95 | 2.1 | 0.07 |
| 100 | 7.5 | 3.1 |

The above table shows that at the optimum concentrations of methanol, i.e. 90–95%, the greatest difference exists between the solubility of stove oil in the solvent, and in the urea-saturated solvent. Similar values hold for the optimum concentrations of water in the other solvents.

The solvents described herein also possess low solubilities in the feed oil, as is illustrated in the following table showing the solubility of methanol-water mixtures in stove oil:

TABLE 3

*Solubility of methanol-water mixtures in stove oil*

| Concentration of Methanol, Volume Percent | Solubility, Volume Percent | |
|---|---|---|
| | 77° F. | 122° F. |
| 80 | 0.1 | 0.1 |
| 90 | 0.25 | 0.4 |
| 95 | 0.5 | 1.0 |
| 100 | 1.4 | 3.8 |

The losses of solvent to raffinate oil or extract oil are hence small and may be easily recovered therefrom by water washing.

The solubility relationships of other solvents included herein will be apparent from the following table which compares solubility data in various solvents for a stove oil raffinate prepared by removing adduct-forming materials from the foregoing stove oil (boiling range 325– 580° F.) by treatment with urea. The data relate urea-saturated methanol, ethanol, and acetone, and water mixtures thereof in terms of volume-percent of raffinate oil dissolved at 77° F.

TABLE 4

*Solubility of stove oil raffinate in urea-saturated solvent mixtures at 77° F.*

| Composition of Solvent, Vol. Percent | | Solubility of Oil in the Solvent | | |
|---|---|---|---|---|
| Organic Component | Water | Methanol | Ethanol | Acetone |
| 70 | 30 | 0.10 | ------ | 0.03 |
| 80 | 20 | 0.06 | 0.07 | 0.30 |
| 90 | 10 | 0.08 | 0.15 | 3.6 |
| 95 | 5 | 0.07 | ------ | ------ |
| 100 | 0 | 3.1 | 11. | miscible |

The invention is also based in part upon the increased solubility of urea in the solvent mixtures upon slight changes in temperature. This permits the redissolving of urea upon decomposition of the adducts at high temperatures. The following data compare the solubilities of urea in methanol-water at a typical adduction temperature of 77° F., and a typical regeneration temperature of 122° F.:

TABLE 5

| Concentration of Methanol, Volume Percent | Solubility of Urea, g./100 g. Solvent | |
|---|---|---|
| | 77° F. | 122° F. |
| 80 | 32 | 43 |
| 90 | 28 | 41 |

From all the above it will be apparent that the solvents disclosed herein possess optimum differential solvent capacities for urea and for the hydrocarbon feed oils at the various temperatures employed in the process, all of which renders possible the herein described wholly liquid phase operations.

After the initial contacting stage, the reaction slurry is subjected to the gentle agitation technique which is required to obtain complete separation of raffinate oil. If the reaction slurry is simply allowed to stand without agitation, a large proportion of the unreacted oil will remain enmeshed within the thixotropic slurry. The extent to which this occurs depends to a large degree on the relative proportion of adduct-forming and non-adduct-forming hydrocarbons which were present in the feed. If the feed was rich in adduct-forming hydrocarbons, the proportion of adduct to unreacted oil will be large and hence the holdup of unreacted oil will also be large. Conversely, if the proportion of adduct-formers was small, there will be a large proportion of unreacted oil and a small proportion of adduct. Under these latter conditions, a large part of the unreacted oil may separate spontaneously. In any case however there will remain associated with the adduct a proportion of unreacted oil which may vary from about 0.5 to 5 times the amount of oil which was adducted. It has been discovered that this non-adducted oil may be substantially all recovered if the slurry is subjected to gentle agitation, i.e. agitation which is insufficient to redisperse the oil, but is sufficient to disturb the interlacing adduct network and permit the gradual release and rising of oil droplets. This optimum degree of agitation may vary somewhat for different slurries, and hence can best be determined by experimentation. In general however it may be said that when paddle type agitators are employed they may be operated at between about 5 and 200 revolutions per minute. If a screen-type reciprocating agitator is employed, the optimum linear velocity thereof may vary between about 0.1 and 5 feet per second. These values however may vary considerably for different sizes and types of reaction vessels, agitators etc. It has been found that any degree of agitation beyond the optimum will substantially decrease the rate of separation of raffinate oil. These factors are well illustrated in the following example.

EXAMPLE 1

Feed oil, straight run stove oil:
Gravity, ° API (60° F.) _____ 36.5
Boiling range _____°F__ 329–590
Vol. percent straight-chain hydrocarbons __ 9.0
Freezing point _____°F__ −10

Reagent:
35.4% wt. percent urea in solvent consisting of 95 vol. percent methanol, 5 vol. percent water.

In each of the following runs, about 3.3 volumes of reagent were vigorously agitated with one volume of feed oil for 11–14 minutes at 86° F., and the resulting reaction slurries were then passed continuously downwardly through a cylindrical settling vessel 12 inches in length at the rate of 2.3–2.5 cm. per minute. The settling vessel was equipped with 13 spaced, horizontal agitator vanes attached to a vertical shaft extending axially through the vessel. Under various condition of agitation the amount of raffinate oil recovered as supernatant phase was as follows:

TABLE 6

| Separator stirring rate, r.p.m. | Vol. Percent of Feed Recovered as Raffinate | Raffinate Freezing Pt., °F. |
| --- | --- | --- |
| 0 | 33.7 | −90 |
| 38 | 86.7 | −90 |
| 61 | 88.4 | −90 |
| 120 | 81.4 | −90 |
| 270 | 0.0 | |

These results demonstrate clearly the critical role of agitation during the raffinate separation, and also show the marked reduction in freezing point which the feed oil undergoes as a result of the removal of normal paraffins.

In a typical operation, a slurry of urea in a urea-saturated solvent mixture (reagent slurry) is contacted with a hydrocarbon mixture of adduct forming and non-adduct forming components at a temperature between about 30° and 100° F., preferably with vigorous agitation. Under these conditions the reagent slurry reacts with the hydrocarbon mixture to form the reaction slurry, consisting of adduct slurry plus dispersed unreacted oil. The reaction is usually substantially complete within about 5–30 minutes. The reaction slurry is then subjected to separation under conditions of controlled agitation or centrifuging in order to cause separation of the unreacted oil. The supernatant non-reacted oil is then separated, and the remaining lower phase of adduct slurry is removed as the more dense phase.

The adduct slurry is thereafter heated to a temperature sufficient to decompose the adduct into its constituents, thereby forming an insoluble extract oil which is rich in adduct-forming components, and a solvent solution of urea. Suitable regeneration temperatures may range for example between about 90° and 300° F. The extract oil forms a second supernatant layer which is then separated from the urea solution. The remaining urea solution is then cooled to precipitate solid urea and thus reform the reagent slurry for recycling.

In certain cases the amount of urea may be so controlled as to produce a saturated or nearly saturated solution at the adduct-forming temperature for recycle. Usually however the amount of urea employed is in excess of that required to saturate the solvent at the particular adduct-forming temperature employed.

Small amounts of solvent are lost by virtue of their solubility in the raffinate and extract oils. Each of these streams is preferably separately washed with water or otherwise processed such as by distillation to recover the solvent for recycle.

In one modification of the invention the adduct is formed and the reaction slurry is then successively heated in a series of two or more stages to form increments of adduct-forming oil at successively higher temperatures in one or more rectification stages. Each of the increments of oil thus obtained is separated and all or a part thereof is recycled to the reaction stage immediately preceding for reformation of the adduct. This method of operation produces a continuous countercurrent separation.

Similarly the oil may be successively contacted with urea and/or urea adducts under conditions of increasing tendency to form adducts. In this method of operation lean oil (lean in adduct-forming compounds) is contacted with a reagent slurry to form adducts with the least readily adduct-forming materials in one stage. The slurry of urea, adduct and solvent then passes to the next stage at a slightly higher temperature where it contacts slightly richer oil, i.e. oil richer in adduct-forming components. The raffinate oil in each case passes countercurrent to the reagent slurry and contacts the same at successively lower temperatures. Operation in this manner causes countercurrent removal of the adduct-forming materials in one or more stripping stages with recycle of components having slight or intermediate tendency to form adducts.

Both stripping and rectification stages may be employed simultaneously moreover. In this modification the feed is contacted with reagent slurry from a stripping stage to form a new reaction slurry and raffinate oil. The raffinate oil passes countercurrent to the reagent slurry at successively lower temperatures thereby producing a stripped raffinate oil. The reaction slurry from the feed engaging stage passes successively through the rectification stages at successively higher temperatures. The oil in each case is in part at least recycled to the preceding feed engaging, or other rectification stage.

The herein described liquid phase operations are particularly advantageous with respect to multi-stage rectification or stripping operations, because it is in these operations that the problems and expense involved in the separation and handling of a discrete solid phase and liquid phase for each stage are most accentuated. It will be understood that each stage in such processes consists of a mixing zone for adduct formation, or reformation, followed by a non-quiescent settling zone for recovering whatever entrained oil was left unreacted, or was liberated from the adduct in the preceding mixing zone. Normally, each successive settling zone is maintained at substantially the same temperature as the preceding mixing zone.

Other operative conditions and details may be more readily understood in connection with the drawings. In these drawings:

Figure 1 represents a vertical cross-sectional view of a suitable apparatus for carrying out the described urea-adduction in a series of stages, and illustrates diagramatically certain auxiliary apparatus.

Figure 2 is a cross-sectional view of Figure 1 taken along line 2—2.

Figure 3 is a cross-sectional view of Figure 1 taken along line 3—3.

Figure 4 is a schematic illustration of an apparatus similar to that shown in Figure 1, but modified to permit a slightly different type of operation as hereinafter described.

Figure 5 is a schematic illustration of an alternative process scheme utilizing a single stage operation and employing a centrifuge to accomplish raffinate separation.

Referring now particularly to Figures 1, 2 and 3, the principal piece of apparatus consists of an elongated cylindrical vessel 4 which may be composed of stainless steel, mild steel or other suitable structural material, and may be of any desired dimensions. Traversing the central axis of vessel 4 is a rotatable shaft 5, which is rotated by motive means not shown. Attached to shaft 5 at intervals along its length, which coincide with the mixing zones hereinafter described, is a series of agitating vanes or propellers 6. Near one side of the vessel 4 is inserted a second vertical shaft 8 which is mounted for reciprocating vertical motion by motive means not shown. Both shafts 5 and 8 are mounted in liquid-tight seals 9 at the top and bottom of vessel 4. Attached to shaft 8 at intervals along its length, said intervals coinciding with the settling zones hereinafter defined, is a series of circular agitator screens 10, which are rigidly mounted to shaft 8 by a suitable weld or other attachment to circular mounting frame member 11. Screens 10 may be of mesh size between about 0.5 and 12 for example. In the apparatus illustrated, two rotary agitators 6 are provided for each mixing zone, and two reciprocating screen agitators 10 are provided for each settling zone, but it will be understood that in each zone a larger or smaller number of agitators may be employed.

Vessel 4 is divided horizontally into alternating mixing zones 12, 12a, 12b and 12c, and settling zones 13, 13a, 13b, and 13c by means of alternating circular baffle members 14 which extend horizontally across the interior of vessel 4 forming the upper boundary of each mixing zone, and slightly sloping baffle members 15 which form the upper boundary of each settling zone, and are designed for the collection of raffinate oil on the underside thereof. Baffle members 14 are attached to the walls of vessel 4 around the entire inner circumference thereof except for a small peripheral segment which is cut away to leave openings 18 for the passage of fluid therethrough. Baffle members 15 are constructed similarly to members 14 except that they are sloped slightly downwardly from the side of vessel 4 immediately below openings 18, thus providing a subjacent space 20 in which lighter liquid may collect and is retained for withdrawal into outlets 21 which are located near the highest point below the members 15. Baffle members 15 also terminate a short distance from the outer wall of vessel 4, leaving liquid passageways 22 which are preferably spaced diagonally from the alternate openings 18, whereby the liquid flow must diagonally traverse the alternating mixing zones and settling zones.

Other adjuncts of the apparatus consist of conventional ports 25, 26, 27 and 28 to provide inlets and outlets for the various fluid streams. Also provided are internal liquid recycle pipelines 29, 30 and 31 which are designed to return by simple gravity flow the light oil which collects under baffle members 15 to the second preceding mixing zone, to thereby accomplish multistage stripping and/or rectification. The upper outlets of return lines 29, 30 and 31 are preferably provided with bubble caps 33, or other suitable check valves to permit the upward flow of light oil whenever a sufficient body of such light oil has collected in the return lines and below baffle members 15 to provide the necessary buoyancy to raise bubble caps 33. These bubble caps also prevent the downward flow of reagent through the lines 29, 30 and 31.

The manner in which the apparatus of Figures 1, 2 and 3 is operated will be more apparent by following the fluid flow therethrough in a typical process. The feed oil, preheated or cooled to a suitable contact temperature, is introduced through inlet line 28, and contacts reagent slurry descending from the superjacent settling zone 13. The mixture of feed and reagent slurry is then agitated in zone 12a at a temperature between for example about 30° and 100° F., whereby most of the adduct-forming components are reacted with the urea. The resulting reaction slurry then flows downwardly via aperture 22 into lower settling zone 13a, wherein the unreacted oil is allowed to rise under conditions of gentle agitation into the space 20 below baffle member 15. This unreacted oil constitutes the first raffinate, and will contain a minor proportion of unreacted adduct-forming materials. This first raffinate is therefore allowed to rise by buoyancy through pipeline 29 to a stripping stage wherein it is reacted with fresh reagent slurry.

The stripping stage comprises agitating zone 12 and settling zone 13. Both of these zones are maintained at a temperature suitably 5° to 20° F. lower than the initial contacting zone 12a. It will be understood that these temperature differentials are maintained in zones 12 and 12a by suitably preheating or cooling the feed oil, and by suitably cooling the recycle reagent slurry which is admitted through inlet line 25. The fresh recycle reagent slurry entering through line 25 passes downwardly through aperture 18 and contacts the first raffinate oil which rises through pipe 29 and escapes around the lower edge of bubble cap 33. In mixing zone 12 these two components are thoroughly agitated under such conditions of temperature as to strip any remaining adduct-forming materials from the oil, and form a substantially homogeneous reaction slurry. The adduct formed in this stage will be a substantially weaker adduct than those formed in succeeding stages carried out at higher temperatures. The residence time in this reaction zone, as well as in the subsequent reaction zones, may range between about one and thirty minutes for example.

The reaction slurry from zone 12 then flows downwardly through aperture 22 into settling zone 13, wherein the final raffinate oil is allowed to rise under the previously described mild agitation conditions to form a supernatant layer under baffle member 15, and is then drawn off via line 21a. The withdrawal of raffinate oil through line 21a is controlled by interface level controller 35 which operates motor valve 36.

The adduct slurry which forms in settling zone 13 then constitutes the reagent slurry which is contacted with the fresh feed material in zone 12a as previously described.

The adduct slurry forming the lower layer in settling zone 13a contains substantially all of the adduct-forming materials of the feed, and may also retain by adsorption and/or entrainment a minor proportion of relatively non-adduct forming materials. In order to effect rectification of this adduct, the slurry is passed downwardly via aperture 18 into agitating zone 12b wherein it is contacted with more highly adduct-forming reflux oil recycled via line 31 from a succeeding higher temperature adduct decomposition stage. Zone 12b is preferably maintained at a temperature 5° to 20° F. higher than zone 12a, and this may be accomplished for example by suitably preheating the reflux oil in line 31, as by means of a steam jacket 38. In zone 12b heat and agitation cause the reflux oil from line 31 to displace relatively less adduct-forming materials from the adduct. The resulting reaction slurry then flows via aperture 22 into the succeeding settling zone 13b wherein the displaced oil is allowed to rise as previously described. This displaced oil is preferably recycled via line 30 to the feed engaging zone 12a where it is stripped of adduct-forming components.

The remaining adduct slurry in settling zone 13b then flows downwardly through aperture 18 into final rectification mixing zone 12c, which is preferably maintained at a temperature 5° to 20° F. higher than zone 12b. Here additional adduct is decomposed, and the reaction slurry flows into settling zone 13c, wherein a supernatant oil layer is formed composed of the relatively strongly adduct-forming materials which are recycled to zone 12b to effect rectification as previously described. The final adduct slurry in the lower portion of zone 13c may then consist of substantially pure n-paraffin adducts of urea. This adduct slurry is then withdrawn through outlet 26 and line 40, heated to a suitable decomposition temperature by means of heater 41 (e.g. 110–250° F.), and passed via line 42 into liquid-liquid separator 43, wherein the final extract oil separates and is withdrawn through line 44. The lower layer in separator 43 then comprises a hot solution of urea plus a minor proportion of dissolved extract oil. This lower layer may be cooled and recycled directly to the initial contacting zone 12, or it may be passed via line 45 into a countercurrent scrubbing column 46, wherein it is washed with a solvent to remove any remaining traces of dissolved extract oil. The solvent employed for scrubbing the reagent solution may comprise either a portion of the raffinate oil from line 21, in which case it is admitted via lines 47 and 48, or it may comprise a lighter hydrocarbon boiling substantially lower than the feed material, in which case it is admitted via lines 49 and 48.

In one method for disposing of the wash oil from scrubbing column 46, which contains some highly adduct-forming material, the entire solution may be returned via line 50 to one of the agitating zones in vessel 4. If raffinate oil is employed as the wash solvent it may be desirable to recycle the solution to zone 12a or 12b, depending upon the relative proportion of raffinate oil and extract oil present therein. In the case illustrated however it is assumed that a low boiling wash oil is employed, such for example as cyclohexane or isooctane. The use of such wash solvents contributes the advantage of further decreasing the viscosity of the slurries in reaction vessel 4. This is ordinarily a significant problem only in the lower portion of the vessel; the upper portions being characterized by a sufficient volume of raffinate oil to decrease the viscosity sufficiently.

When the wash oil solution from line 50 is recycled to the lower mixing zone 12c, it may be admitted at a temperature sufficiently high to maintain the desired temperature level in zone 12c. The low boiling wash liquid then separates out with the reflux oil in zone 13c, and is passed via line 31 to rectification contacting zone 12b, settling zone 13b, and recycle line 30. Inasmuch as recycle line 30 leads to the feed contacting stage 12a wherein viscosity is presumed to be not a problem, it may be desirable to remove the low boiling hydrocarbon before the dissolved reflux oil is admixed with the feed oil and slurry in zone 12a. This may be accomplished by withdrawing the recycle stream in line 30, and transferring it via line 52 to distillation column 53, wherein the low boiling solvent is taken overhead through line 49 for return to scrubbing column 46. The bottoms from column 53 constitutes the stripped reflux from line 31, which is then returned via line 54 to recycle line 30.

The bottoms from stripping column 46 constitutes the regenerated solvent-urea reagent, which is then recycled via line 56 to cooler 57 wherein it is cooled to a temperature sufficiently low to precipitate a part of the urea, and to maintain the desired temperature in mixing zone 12.

The final raffinate oil which is withdrawn through line 21a is transferred to a countercurrent water scrubbing column 59 wherein residual traces of solvent are removed by water scrubbing. The final solvent-free raffinate oil is withdrawn through line 60, while the water-methanol wash liquor is removed through line 61 and transferred to a distillation column 62 wherein methanol is recovered overhead via line 63 and returned to the urea reagent recycle line 56.

Obviously many modifications can be made in the procedure described above. One such modification is illustrated in the accompanying Figure 4. Figure 4 illustrates schematically an apparatus generally similar to that of Figure 1, but with certain modifications which permit the elimination of the reflux oil recycle lines 29, 30 and 31. In Figure 1 the reflux oil from each settling stage was passed upwardly to a preceding reaction stage while by-passing the intervening settling stage. The modification shown in Figure 4 provides for the continual upward reflux of oil from each separation stage without by-passing the intervening mixing and settling stages, thereby simplifying the apparatus.

In Figure 4, the cylindrical contacting vessel 65 may be similar to vessel 4 of Figure 1. Longitudinally traversing one side of vessel 65 is a vertical, reciprocating shaft 66 carrying a series of rigidly affixed circular agitator screens 67, similar to screens 10 of Figure 1. Vessel 65 is divided horizontally into alternating settling zones and agitating-reaction zones by means of inclined baffle plates 68, 68a, 68b and 68c, alternating with oppositely inclined baffle plates 69, 69a, 69b and 69c. All of these baffle plates are disc-shaped members with two diametrically opposed segmental areas cut away to provide adduct slurry downflow passageways 75, oil upflow passageways 76, reaction slurry upflow passageways 77, and reaction slurry downflow passageways 78. The circular periphery of each baffle plate is welded or otherwise affixed in fluid-sealing relationship to the inner walls of vessel 65.

The feed oil is introduced to feed-engaging-reaction zone 70 via line 71, and contacts downwardly descending adduct slurry from settling zone 72, as well as upwardly flowing reflux oil from settling zone 83. Agitator blades 74 are preferably set with their pitch in such direction as to cause a slight fluid flow toward the right-hand side of the apparatus, thereby creating a higher pressure in the right-hand portion of zone 70, and a lower pressure in the left-hand portion of zone 70. This, aided by the density differences of the several materials, causes a downward flow of adduct slurry from zone 72 via aperture 75, and an upward flow of reflux oil from settling zone 83 via aperture 76. The reaction slurry which is formed in zone 70 then flows partly upwardly through aperture 77 into settling zone 72, and partly downwardly through aperture 78 into settling zone 83. In the other reaction zones 79, 80 and 81, a substantially similar fluid flow pattern is maintained by suitably adjusting the pitch of agitator blades 74, and the relative size of the apertures 75, 76, 77 and 78. Each of the reflux oil apertures 76 is preferably adjusted so that all of the reflux oil which separates in each of the settling zones 82, 83, 84 and 85, passes upwardly, while little if any of the adduct slurry therefrom is allowed to pass upwardly. In this manner an overall downward flow of adduct slurry is maintained, and an upward flow of oil is maintained. Rectification is thus effected in a manner analogous to fractional distillation.

In one modification of Figure 4, differences in density between the oil phases, the adduct slurry phases, and the reaction slurry phases may alone be relied upon to effect the desired upflow-downflow rectification, i.e. without the aid of powered flow-directing means such as agitators 74. Thus, from each settling zone, the flow of separated oil will always be upward into the superjacent mixing zone by gravity alone. The reaction slurry from each reaction zone is less dense than the adduct slurry in the preceding settling zone. By suitably adjusting the overall fluid downflow rate, a part of the lighter reaction slurry from each reaction zone will move upwardly countercurrently to the downflowing adduct slurry. In this manner a continuous upward reflux of adduct-forming oil is maintained.

The portion of reaction slurry passing downwardly from reaction zone 70 via aperture 78 is allowed to settle in settling zone 83 under the limited agitation conditions previously described. The resulting reflux oil phase passes entirely upwardly into feed-engaging-reaction zone 70, along with more highly adduct-forming reflux oil which separates from the reaction slurry passing upwardly via aperture 77 from hotter reaction zone 79 into cooler settling zone 83. In zone 70 the combined reflux oil effects rectification of the adducts formed from the fresh feed, and is itself stripped of adduct-forming components.

It should be noted that in settling zone 83, some degree of rectification may occur as a result of the difference in temperature between the down-flowing reaction slurry from mixing zone 70 and the up-flowing reaction slurry from mixing zone 79. Part of the cool adduct from zone 70 will be decomposed by the heat of the up-flowing stream from zone 79, while to some small degree the cooling effect of the down-flowing stream may cause some of the up-flowing urea to recombine with free adduct-forming hydrocarbons. This latter effect is minimized however by the lack of vigorous agitation in settling zone 83. The net effect is that the total oil phase which separates in zone 83 and passes upwardly to reaction zone 70 will be richer in strong adduct-forming hydrocarbons than the free hydrocarbons in the down-flowing reaction slurry from zone 70. Hence rectification by adduct-displacement and adduct-exchange may occur in both the reaction zones and the settling zones.

The adduct slurry from settling zone 83 then flows downwardly through aperture 75 into rectification-reaction zone 79 wherein it is suitably heated to a temperature 5° to 20° F. higher than that prevailing in zone 70, by means of a suitable heating element 95. Up-flowing reflux oil from settling zone 84 also passes upwardly into reaction zone 79 to effect adduct-exchange therein in a manner similar to that described in connection with reaction zone 70. The down-flowing portion of reaction slurry from zone 79 then flows through aperture 78 into settling zone 84, wherein settling occurs similarly to that described for zone 83.

The adduct slurry from settling zone 84 then flows downwardly through aperture 75 into final rectification-reaction zone 80, which is suitably maintained at a temperature 5° to 20° F. higher than that prevailing in reaction zone 79 by means of heating element 96. Here, further rectification takes place as a result of incremental heating plus the displacing effect of rising reflux oil from final settling zone 85.

The downflowing portion of reaction slurry from zone 80 then flows through aperture 78 into final settling zone 85 wherein the final separation of a reflux oil takes place. The remaining adduct slurry in zone 85 is then withdrawn through line 86, and is heated to regeneration temperatures as described in connection with Figure 1, for decomposing the adduct and recovering the final extract oil and the regenerated reagent.

The regenerated reagent is recycled to line 87, after being cooled to a suitable temperature to maintain stripping-reaction zone 81 at a temperature e.g. 5° to 20° F. lower than that of feed-engaging reaction zone 70. In stripping zone 81, the up-flowing raffinate oil from settling zone 82 is subjected to a stripping operation with fresh reagent at the lowest temperatures in order to effect removal of any remaining n-paraffins. The portion of the resulting reaction slurry which flows upwardly through aperture 77 into raffinate settling zone 90 contains the final purified raffinate, which forms a supernatant layer 91. This final raffinate oil is then withdrawn through line 92, and subjected to water washing to remove traces of solvent as previously described.

It will be apparent that the procedure described in connection with Figure 4 provides a remarkable simply multi-stage operation, both as regards apparatus and operation. Obviously many modifications may be made in the details described, particularly with reference to variations in the type of baffling employed in column 65 to obtain the optimum upward and downward flow of oil and reagent in the various reaction zones and settling zones.

Referring now more particularly to Figure 5, a hydrocarbon feed stock containing both adduct-forming and non-adduct-forming components passes through line 100 to mixing vessel 101. Recycle reagent comprising e.g. urea and a saturated solution of urea in methanol-water from line 102, passes through interchanger 103, line 104, and line 100 to mixing vessel 101.

Mixing vessel 101 is preferably fitted with a mechanically driven stirrer 105. The liquid within mixing vessel 101 is maintained at a suitable adduct-forming temperature such as between about 30° to 90° F. for example. Greater or lesser temperatures may be employed depending upon the ratio of feed to reagent, upon the volumetric proportion of adduct-forming materials in the feed stock and upon equilibrium constants of the particular adduct-forming components. Lower temperatures generally favor increased adduct formation and result in larger yields of extract oil and decreased yields of raffinate oil.

The residence time of the reagent slurry and hydrocarbons in vessel 101 is sufficient to effect a suitably complete adduct formation. The solvents of this invention normally effect substantially complete adduct formation in a few minutes and residence times greater than 30 minutes are seldom required. Effluent from mixing vessel 101 is withdrawn as a reaction slurry through line 107, whence it passes to centrifuge 108. Centrifuge 108 is fitted with less dense liquid outlet 109 and more dense liquid outlet 110. The rate of withdrawal from outlet 109 is controlled to produce a raffinate oil therefrom which contains traces of dissolved methanol, but which is substantially free of entrained solids or liquids. Similarly the rate of withdrawal from outlet 110 is controlled to produce an adduct slurry and perhaps excess urea in a urea-saturated methanol-water solution substantially free of unreacted raffinate oil.

In the modification illustrated, centrifuge 108 is equipped with a mechanical vibrator 112 which imparts low-amplitude, high-frequency vibrations, for example in the sonic range to centrifuge 108 thereby facilitating the separation of raffinate oil by agitating the slurry. By employing vibrator 112, the plastic yield point of the slurry is reduced, permitting satisfactory separation of raffinate at a lower centrifugal force than would otherwise be required. This minimizes the separation of solid adduct from the solvent phase.

The slurry discharged from outlet 110 passes through line 111 to heater 112 wherein the slurry is heated to a temperature sufficient to decompose the adduct and form two clear liquids, the one an extract oil, and the other a urea solution in methanol-water. The temperature of adduct decomposition varies with the molecular weight and boiling range of the hydrocarbon component of the adduct, and may range e.g. between about 110 and 200° F. Urea adducts of paraffins boiling below about 600° F. are completely decomposed at 160° F. Higher molecular weight hydrocarbons require higher temperatures generally. Higher temperatures may be employed where pressure is employed to prevent evaporation of the methanol-water solvent for example.

The extract oil and urea-methanol-water solution pass via line 114 to settling vessel 115, wherein the lighter extract oil floats to the top and is withdrawn through line 116, and the heavier reagent solution or slurry is withdrawn from the bottom to line 117. Hot reagent in line 117 passes through line 102 for passage through interchanger 103 for appropriate cooling.

The extract oil in line 116 is rich in adduct-forming hydrocarbons and contains a small amount of dissolved methanol which is preferably recovered for recycle. The methanol recovery is effected by passing the extract oil in line 116 to water wash column 119 wherein it passes upwardly countercurrently to a descending stream of water introduced through line 120. Water washed extract oil substantially free of methanol is removed through line 121 whence it passes to storage not shown. Aqueous methanol from water wash column 119 is withdrawn through line 122 whence it flows to distillation column 124 wherein the methanol is fractionated from the water wash. Methanol containing minor amounts of water passes overhead in column 124 and is withdrawn through line 125 whence it flows through condenser 126 to line 102 carrying recycle reagent.

The raffinate oil discharged from outlet 109 of centrifuge 108 contains small amounts of methanol also. The raffinate oil flows through line 127 to water wash column 128 wherein it contacts a descending column of water for methanol extraction. Methanol-free raffinate oil is withdrawn through line 129 whence it passes to product storage not shown. The aqueous methanol is withdrawn through line 130 whence it passes to methanol distillation column 124 for methanol recovery as described hereinbefore.

A particular feature of the invention as shown in Figure 5 resides in the limited solubility of the extract oil in the recycle reagent. Thus the hot reagent withdrawn through line 117 from separating vessel 115 will generally contain less than 0.4% by volume of dissolved extract oil and under some conditions of operation will contain less than 0.1% by volume of such oil. The presence of this oil tends to decrease the adduct-forming capacity of the system.

Under certain conditions a portion of the reagent in recycle line 102 may be by-passed by opening valve 132, whence it flows through cooler 133 to line 107, and thence to centrifuge 108. The use of additional reagent increases the fluidity of the slurry in the centrifuge, and facilitates the transfer and centrifuging of the slurry as an ordinary liquid. The reagent introduced through valve 132 may be cooled to temperatures sufficient to decrease or increase the amount of adduct present in centrifuge 108 if desired by suitable control of the cooling in interchanger 133.

If desired, extract or raffinate oil may be recycled to either mixing vessel 101 or to centrifuge 108 or both. Recycle oils may be employed to improve the product quality, or to increase the fluidity of the slurry mixtures.

The following examples are cited by way of illustration, but are not intended to be limiting in scope:

EXAMPLE 2

About 3000 ml. of a saturated solution of urea in aqueous methanol containing 90% methanol by volume was prepared by saturating the methonal-water at about 86° F. About 446 grams of additional urea was added thereto to form a reagent slurry. The excess crystalline urea was in an amount such that a clear solution would be obtained by heating and mixing at above 140° F.

The urea reagent was then employed to treat a stove oil having the following characteristics.

Distillation (ASTM), ° F.:
  Initial _____ 324
  10% _____ 403
  50% _____ 456
  90% _____ 522
  Maximum _____ 580
Gravity, ° API _____ 37.7
Acid solubility, vol. percent _____ 22
Freezing point, ° F _____ −37
Refractive index, $n_D^{20}$ _____ 1.4615
n-Paraffin content, vol. percent _____ 11

For the first run, 1500 ml. of stove oil were vigorously agitated for 20 minutes with the urea reagent at 86° F. The reaction slurry was then stirred slowly at 86° F. with a stirring rod for 10–15 minutes, or until no further raffinate oil appeared to be separating. In the absence of stirring, only a small proportion of the raffinate oil would separate. The clear unreacted oil was then decanted leaving an adduct slurry composed of methanol, water, urea and urea adduct. The adduct slurry was then heated to about 150° F. and a clear oil and a clear liquid reagent mixture was obtained. The extract oil was separated from the clear reagent and the reagent was cooled to about 86° F. and reemployed to treat a fresh 1500 ml. portion of stove oil. The process of separating the raffinate oil from the slurry, heating the slurry to decompose the adduct, cooling the separated reagent and recycling was repeated until a total of six portions of stove oil had been treated. The following data were obtained thereby:

TABLE 7

| Run Number | Product Recovery, ml. | | Freezing Points, ° F. | |
|---|---|---|---|---|
| | Raffinate | Extract | Raffinate | Extract |
| 1 | 1,273 | 173 | −100 | 8 |
| 2 | 1,273 | 220 | −100 | 10 |
| 3 | 1,225 | 225 | −100 | 11 |
| 4 | 1,116 | 390 | −100 | 10 |
| 5 | 1,173 | 243 | −100 | 2 |
| 6 | 1,302 | 248 | −100 | 13 |

Methanol equal to 0.39% by volume of the extract oil and to 0.23% by volume of the raffinate oil was recovered by water washing and fractional distillation of the water washings. The average recovery of runs 1 through 6 showed an average 81.8% yield of raffinate oil, a 16.7% yield of extract oil, and a total oil recovery of 98.5%. The loss of 1.5% is attributable to experimental error and losses in handling.

From the foregoing data it is apparent that the methanol-water-urea reagent may be used repeatedly with small losses of oil and with limited losses of methanol to the oil layers. The oil is readily freed of methanol by water washing.

When the 90% methanol-10% water is replaced with 100% methanol, excessive losses of oil to the methanol and losses of methanol to the oil occurs. When the water content of the methanol is above about 30% the rate of adduct formation decreases rapidly and reaction times up to several hours then become necessary.

Favorable results are also obtained when the 90 volume percent methanol in water is substituted with either 80 volume percent acetone in water or 80 volume percent ethanol in water.

EXAMPLE 3

In another series of experiments 200 ml. portions of the stove oil of Example 1 were treated with 70, 80, 90 and 100% by volume of methanol in methanol-water mixtures. In each case the solvent was saturated with urea at about 77° F. and an additional 50 grams of urea was added to 400 ml. of such solution. The oil and reagent were contacted for 20 minutes at about 77° F. in each case. The following data show the recovery of oil in each case.

TABLE 8

| Concentration of Methanol, Vol. percent | Yield of Raffinate Oil, ml. | Freezing Point of Raffinate Oil, ° F. |
|---|---|---|
| 100 | 158 | −100 |
| 90 | 169 | −100 |
| 80 | 170 | −68 |
| 70 | 182 | −65 |

The foregoing data show that there would be high losses of oil to the solvent where the methanol concentration is 100%, as compared to aqueous methanol mixtures.

In each of the cases the adduct slurry was readily separated from the raffinate oil by gently stirring the reaction slurry for a few minutes. The resulting adduct slurry is readily handled as a single liquid phase without requirement of expensive and time-consuming filtration techniques.

EXAMPLE 4

This example illustrates a suitable continuous operation for the treatment of a stove oil to lower its freezing point. The principal apparatus consisted of:

(1) A vertical, cylindrical glass reaction vessel, 2.75 inches in inside diameter and 24 inches in length, equipped with seven 3000 r.p.m., 1 inch propellers spaced evenly along its length.

(2) A vertical, cylindrical, glass raffinate settling vessel 12 inches in length and 3 inches in inside diameter, equipped with low-speed agitators, and otherwise similar to the settling vessel described in Example 1.

(3) A reagent cooler consisting of a cold water jacketed, 1 inch glass tube, fitted coaxially with an internal mechanical scraper to remove solid urea which tends to crystallize on the cool surface.

(4) A regeneration heating vessel, 0.53 gallon capacity, equipped with a mechanical stirrer.

(5) Extract settling-separating vessels, total capacity 0.42 gallon.

In a continuous 33-hour run, feed stove oil was admixed with recycle urea-reagent, and pumped downwardly through the reactor at 86° F. and at a rate sufficient to provide a residence time of 14 minutes. The urea-reagent was 35.4 wt. percent urea, and 64.6% solvent; the solvent was 95 vol. percent methanol and 5 vol. percent water. The ratio of reagent to feed oil was 3.3/1 by volume, providing urea equivalent to about 15% n-paraffins based on total feed oil. The reaction slurry was then pumped downwardly through the settling vessel at a linear velocity of 2.0 cm. per minute while rotating the agitator vanes at 61 r.p.m. Raffinate oil was continuously withdrawn from the top of the separator. Adduct slurry was withdrawn from the bottom of the separator, heated to 150–158° F. and allowed to settle for about 20 minutes while continuously flowing through the extract-separating vessels. Extract oil was continuously withdrawn, and the lower phase of regenerated urea solution was continuously recycled to the reaction vessel, after first being passed through the reagent cooler. The composite products from the 33-hour run were as follows:

TABLE 9

|  | Feed | Raffinate | Extract |
| --- | --- | --- | --- |
| Yield, Vol. Percent |  | 85.4 | 14.6 |
| Gravity, °API at 60° F | 36.5 | 35.1 | 44.8 |
| Boiling Range, ° F | 329–590 | 344–594 | 354–589 |
| Freezing Point, ° F | −10 | <−95 | +22 |
| Aromatics, Vol. Percent | 16.3 | 18.1 | 10.9 |
| Bromine No | 3.5 | 2.9 | 2.1 |
| Total Sulfur, Wt. Percent | 0.36 | 0.37 | 0.20 |
| Aniline Point, ° C | 60.2 | 56.3 | 77.5 |
| Refractive Index, 20° C | 1.4660 | 1.4691 | 1.4478 |
| Cetane No | 41.5 | 38.1 | 71.6 |
| Nitrogen, Wt. Percent | 0.080 | 0.071 | 0.072 |

This run clearly demonstrates the feasibility of continuous operation with simple apparatus without substantial loss of reagent, and without separate solids handling or separating procedures.

By carrying out this procedure in a series of stages, i.e. with one stage of raffinate stripping and one or more stages of adduct-rectification, the raffinate yield is increased to about 90%, while the freezing point is less than −95° F.

The lower boiling, lower molecular weight hydrocarbons form adducts only with difficulty. In one modification of the invention the formation of adducts with lower molecular weight hydrocarbons is carried out in the presence of a higher molecular weight adduct-forming recycle oil. The recycle oil readily forms an adduct which tends to initiate the formation of the less readily adduct-forming components. The formation of the less readily formable adducts may even be accomplished by solid solution of the one adduct in the readily formable adduct with consequent improvement in the equilibrium extraction. The recycle oil is removed with the extract oil and is separated therefrom by distillation for example and is recycled to the urea contacting step for adduct formation.

In order to initiate adduct formation, seeding with preformed adduct is sometimes necessary. Once a small amount of adduct has been formed in the adduct forming step, this serves for any further seeding which may be required.

In those cases where the feed oil is rich in adduct-forming compounds, the viscosity of the resulting reaction slurries may suitably be reduced by mixing with the feed a low-boiling, non-adduct-forming diluent as for example, iso-hexane, iso-heptane, cyclohexane and the like. The diluent is then recovered from the raffinate and recycled.

While the above description has been devoted largely to hydrocarbon separations, it will be apparent that other liquid mixtures, the components of which differ in adduct-forming capacity and have hydrocarbon-like solubility characteristics in the described solvents, may be resolved by the same techniques. For example, soy bean acids may be fractionated into drying oils and non-drying oils by selective adduction of liquid esters thereof. Other long-chain esters, alcohols and the like may be fractionated either into more and less branched components, or into more and less saturated fractions, the least saturated components being the strongest adduct-formers with urea. Such compounds should preferably contain at least 10 carbon atoms in order to be sufficiently insoluble in the described solvents.

It is apparent that in broad aspect this invention comprises a continuous process for the separation of relatively adduct-forming materials from relatively non-adduct-forming materials, either in a single stage or in multistage operation. In each case the adduct is formed in the presence of a water-diluted organic solvent which is preferably aqueous methanol or aqueous ethanol. In each case the raffinate oil is separated from the adduct slurry by settling or centrifuging with gentle agitation. The adduct slurry after separation is heated, the liberated extract oil is separated therefrom, and the hot homogenous liquid containing the urea is recycled to the adduct-forming step with appropriate cooling to the desired adduct-forming temperature.

In one modification of the invention the density of the solvent may be further adjusted by incorporation therein of soluble salts or dense organic liquids so that the solvent will then have a density similar to that of the adduct and/or urea. This further minimizes any tendency toward stratification of solids as such in the raffinate separation step.

This application is a continuation-in-part of application Serial No. 231,232, filed June 12, 1951, now abandoned.

The foregoing disclosure of this invention is not to be considered as limiting since many variations may be made by those skilled in the art without departing from the spirit or scope of the following claims.

I claim:

1. In a process for separating relatively adduct-forming hydrocarbons from a mixture thereof with relatively non-adduct-forming hydrocarbons by selective adduction with a reagent selected from the group consisting of urea and thiourea, the improvement which comprises carrying out said selective adduction in a plurality of stages utilizing exclusively liquid-liquid phase separations and entirely avoiding liquid-solid separations, and including the steps of agitating said hydrocarbon mixture under adduct-forming conditions in a feed engaging zone with a solvent-reagent mixture comprising a solution of one of said reagents in a solvent, said solvent consisting essentially of between about 5% and 30% by volume of water and between about 70% and 95% by volume of an organic liquid selected from the class consisting of methanol, ethanol, propanol, isopropanol, acetone, and acetic acid, thereby forming a thixotropic first reaction slurry comprising solvent-reagent solution, solid adduct, and dispersed hydrocarbon raffinate, flowing said reaction slurry to a first settling zone and allowing a first raffinate oil to stratify therein over a subjacent adduct slurry under conditions of mild agitation, passing said first raffinate oil to a stripping zone maintained at a temperature lower than said feed-engaging zone and contacting said raffinate oil therein with more solvent-reagent solution, thereby forming a second reaction slurry, passing said second reaction slurry to a second settling zone and allowing a stripped raffinate oil to stratify therein over a subjacent adduct slurry under conditions of mild agitation, withdrawing stripped raffinate oil from said second settling zone, and passing the subjacent adduct slurry therefrom to said feed-engaging zone to react with fresh hydrocarbon mixture.

2. A process as defined in claim 1 wherein said organic liquid is methanol.

3. A process as defined in claim 1 wherein said organic liquid is ethanol.

4. A process as defined in claim 1 wherein said organic liquid is isopropanol.

5. A process as defined in claim 1 wherein said organic liquid is propanol.

6. A process as defined in claim 1 wherein said organic liquid is acetone.

7. A method as defined in claim 1 wherein the water content of said solvent is further adjusted within the stated range to provide a solvent which, when saturated with urea at 77° F., will dissolve between about 0.01% and 0.2% by volume of said raffinate at 77° F.

8. A process as defined in claim 13 wherein said reagent is urea, and wherein said hydrocarbon mixture employed as feed is essentially a straight-run mineral oil distillate boiling above about 300° F. and containing about 5-25% by volume of n-paraffin components, whereby the stripped raffinate oil recovered from said second settling zone is suitable for use as a low freezing point jet fuel.

9. A process as defined in claim 1 wherein the adduct slurry from said first settling zone is passed to a rectification zone maintained at a higher temperature than said feed-engaging zone, thereby forming a third reaction slurry, passing said third reaction slurry to a third settling zone and allowing a layer of relatively adduct-forming hydrocarbons to stratify therein over a subjacent adduct slurry under conditions of mild agitation, and returning said relatively adduct-forming hydrocarbons to said feed-engaging zone.

10. A process as defined in claim 9 wherein the adduct slurry from said third settling zone is heated to effect decomposition of any remaining adduct therein, thereby forming an extract oil and a regenerated solvent-urea solution, separating said extract oil, and returning said solvent-urea solution to said raffinate stripping zone.

11. A continuous multi-stage process for separating relatively adduct-forming hydrocarbons from a mixture thereof with relatively non-adduct-forming hydrocarbons by selective adduction with a reagent selected from the group consisting of urea and thiourea, which comprises forming a solution of one of said reagents in a solvent consisting essentially of between about 5% and 30% by volume of water and between about 70% and 95% by volume of an organic liquid selected from the class consisting of methanol, ethanol, propanol, isopropanol, acetone and acetic acid, passing said reagent solution generally downwardly through a series of superimposed reaction zones characterized by vigorous agitation, and through a series of intervening settling zones alternating with and communicating with said reaction zones, said settling zones being characterized by relatively mild agitation, each of said reaction zones being maintained at a temperature substantially higher than the preceding reaction zone, introducing said hydrocarbon mixture into an intermediate feed-engaging reaction zone thereby establishing a reaction slurry comprising reagent solution, a suspended adduct phase and a suspended raffinate phase, flowing a part of said reaction slurry upwardly to effect raffinate stripping and a part downwardly to effect adduct rectification, the fluid flow of reaction slurry from each of said remaining reaction zones being similarly in part upward and in part downward whereby each of said settling zones receives slurry from its superjacent and subjacent reaction zones, allowing the total influent to each settling zone to stratify therein forming a supernatant hydrocarbon layer and a subjacent adduct slurry layer, flowing each of the said hydrocarbon layers upwardly into the superjacent reaction zone and each of the said adduct slurry layers downwardly into the subjacent reaction zone, withdrawing stripped raffinate from the topmost of said settling zones, and a rectified adduct slurry from the bottommost of said settling zones, heating said rectified adduct slurry to regenerate said reagent solution and returning said reagent solution to the topmost of said reaction zones.

12. A process as defined in claim 11 wherein each of said settling zones is maintained at an average temperature intermediate between that of its adjacent reaction zones.

13. A continuous multi-stage process for separating relatively adduct-forming hydrocarbons from a mixture thereof with relatively non-adduct-forming hydrocarbons by selective adduction with a reagent selected from the group consisting of urea and thiourea, which comprises forming a solution of one of said reagents in a solvent consisting essentially of between about 5% and 30% by volume of water and between about 70% and 95% by volume of an organic liquid selected from the class consisting of methanol, ethanol, propanol, isopropanol, acetone and acetic acid, passing said reagent solution downwardly through a series of contacting zones including at least two reaction zones and at least two settling zones alternating with said reaction zones, the initial contacting zone being a reaction zone and the final contacting zone being a settling zone, said reaction zones being characterized by (1) relatively vigorous agitation and (2) successively higher reaction temperatures in the downstreamward direction, said settling zones being characterized by (1) relatively mild agitation and (2) temperatures not substantially different from the immediately preceding reaction zone; introducing said hydrocarbon mixture into one of said reaction zones located downstreamwardly from the first reaction zone to effect contacting and reaction therein, separating a non-adducted oil from each of said settling zones, withdrawing as product the non-adducted oil recovered from the topmost settling zone, and recycling the non-adducted oil recovered from all other settling zones to a reaction zone located immediately upstreamward from the preceding settling zone to thereby effect stage-wise stripping of adduct-forming components from said hydrocarbon mixture.

14. A process as defined is claim 1 wherein said organic liquid is methanol.

15. A process as defined in claim 1 wherein said reagent is urea, and wherein said hydrocarbon mixture employed as feed is essentially a straight-run mineral oil distillate boiling above about 300° F. and containing about 5-25% by volume of n-paraffin components, whereby the stripped raffinate oil recovered from said second settling zone is suitable for use as a low freezing point jet fuel.

(References on following page)

References Cited in the file of this patent

UNITED STATES PATENTS

| | | |
|---|---|---|
| 1,662,180 | Ball | Mar. 13, 1928 |
| 2,222,776 | Linke et al. | Nov. 26, 1940 |
| 2,544,752 | Gelbman | Mar. 13, 1951 |
| 2,560,193 | Shoemaker | July 10, 1951 |
| 2,630,405 | Fetterly | Mar. 3, 1953 |
| 2,653,123 | Kirsch et al. | Sept. 22, 1953 |
| 2,681,335 | Gorin | June 15, 1954 |
| 2,700,664 | Weedman et al. | Jan. 25, 1955 |
| 2,719,145 | Skelton et al. | Sept. 27, 1955 |
| 2,729,596 | Mills | Jan. 3, 1956 |
| 2,834,716 | Champagnat et al. | May 13, 1958 |
| 2,855,390 | Champagnat et al. | Oct. 7, 1958 |

FOREIGN PATENTS

| | | |
|---|---|---|
| 1,057,344 | France | Oct. 28, 1953 |

UNITED STATES PATENT OFFICE
CERTIFICATE OF CORRECTION

Patent No. 2,914,455                              November 24, 1959

James L. Keller

It is hereby certified that error appears in the printed specification of the above numbered patent requiring correction and that the said Letters Patent should read as corrected below.

Column 18, line 5, for "accomplished" read -- accompanied --; column 19, line 38, for the claim reference numeral "13" read -- 1 --; column 20, line 64, for "is claim 1" read -- in claim 13 --; line 66, for the claim reference numeral "1" read -- 13 --.

Signed and sealed this 7th day of June 1960.

(SEAL)
Attest:

KARL H. AXLINE                                                ROBERT C. WATSON
Attesting Officer                                       Commissioner of Patents